United States Patent
Klassen

(10) Patent No.: US 6,817,791 B2
(45) Date of Patent: Nov. 16, 2004

(54) IDIOM RECOGNIZING DOCUMENT SPLITTER

(75) Inventor: R. Victor Klassen, Webster, NY (US)

(73) Assignee: Xerox Corporation, Stamford, CT (US)

(*) Notice: Subject to any disclaimer, the term of this patent is extended or adjusted under 35 U.S.C. 154(b) by 81 days.

(21) Appl. No.: 10/408,022

(22) Filed: Apr. 4, 2003

(65) Prior Publication Data
US 2004/0197124 A1 Oct. 7, 2004

(51) Int. Cl.$^7$ ................................................. B41J 5/30
(52) U.S. Cl. .......................... 400/62; 400/61; 400/76; 358/1.15; 358/1.9
(58) Field of Search .............................. 400/61–62, 70, 400/76; 358/1.15–1.17, 1.9

(56) References Cited

U.S. PATENT DOCUMENTS

| | | | |
|---|---|---|---|
| 6,084,688 A | * 7/2000 | Stumbo et al. | ............. 358/1.17 |
| 6,606,165 B1 | * 8/2003 | Barry et al. | ................. 358/1.9 |
| 2002/0186384 A1 | * 12/2002 | Winston et al. | .............. 358/1.5 |
| 2003/0142350 A1 | * 7/2003 | Carroll | ...................... 358/1.15 |

* cited by examiner

Primary Examiner—Minh Chau
(74) Attorney, Agent, or Firm—Fay, Sharpe, Fagan, Minnich & McKee, LLP

(57) ABSTRACT

A method and system is provided for splitting a print job lacking page independence into selected job portions wherein the job portions can be independently processed in a plurality of processing nodes into a printer dependent format for printing by a printer. The print job is searched for selected tokens/idioms known to normally generate a fault upon the independent processing if the print job were to be split into the selected job portions that were intended to be handled independently. The selected tokens found in the search are saved. The print job is then split into the selected portions and the tokens are then associated with the split job portions for guaranteeing processing independence during the processing by the processing nodes.

22 Claims, 2 Drawing Sheets

IDIOM RECOGNIZING DOCUMENT SPLITTER

FIELD OF THE INVENTION

The subject invention relates to printing systems, and, more particularly, processing steps for a print job to split the job into segregated portions to facilitate independent processing of the portions.

BACKGROUND OF THE INVENTION

Generating print-ready documents to be printed by a printing system requires acquiring all the information (content, graphics, production specs, etc.) required to view, process and output the desired document in an electronic form understandable by a print engine. Such systems can range from those that are simple and modestly expensive such as are well known to consumer users of personal computer systems, up to commercial printing systems that are capable of generating in the range of one hundred pages per minute in full color. All systems though have a high level objective of printing faster.

There are three general approaches which have been applied in the past for accomplishing this objective. First, faster serial processing methods suggest optimizing the software and using faster and more expensive processors. Second, job parallel processing sends separate jobs to separate systems and then prints them on a common printer. Third, Portable Document Format ("PDF") based page parallel systems convert the job to PDF, and then split the PDF file into pages which are converted to print ready form on multiple independent processors, with the job being printed on a common printer. Software optimization has its limits and faster processors are also limited by currently available technology. Job parallel processing results in poor single job performance, unpredictable job time and reduced throughput when there is only one long job in the queue. The existing PDF-based solutions are slow due to their need to often convert from a different input language into PDF and then write the PDF file into an input spool disk. Page parallel processing has suffered from the inefficiencies of a throughput disadvantage because per job overhead occurs on a per page basis.

Accordingly, in the continuing need for improving efficiency and speed in printing systems, there is a need for a system which is not limited to mere job or page parallelism and that can facilitate control and data flow of a print job to the printing system while splitting the print job into a plurality of print job portions, each of which can be processed independently and in parallel. How a print job can be better split while ensuring page or chunk parallelism is a subject of this invention.

In addition to parallel processing, there are various other reasons for page independence to be valuable. A document manager may be called upon to reverse the order of the pages of a document prior to printing on a printer that prints pages face up. A user may wish to reprint only a portion of a long document, possibly due to an error in the original printing process or subsequent processing. In this case the document manager would be called upon to extract a sub-document containing the desired pages from the entire document before it is converted to print-ready form. In either of these cases the document manager must construct a valid document that will, when converted to print-ready form, produce the same set of pages as would have been produced had the entire document been physically printed and then either mechanically reversed (in the first case) or the desired pages extracted from the larger set of (physical) pages. When the content of a given page depends on the content of a previous page, this is not possible using prior art techniques. In this case, page independence has been violated. When the content of any given page does not depend in any way on the previous pages processed, the document is page independent.

Document Structuring Conventions ("DSC") conformant PostScript® is one system making page independent processing available; however, there are exceptions in this convention so that page independence cannot always be guaranteed.

In order for a PostScript master to be conformant it must obey the grammar specified by Adobe's report #5001, *PostScript Language Document Structuring Conventions Specification*, available from Adobe's developer support web site. While many PostScript masters violate the rules, there still is a substantial amount of conformant documents. Several reasons exist for this conclusion. First, the conventions are now approaching ten years old, which has given applications and driver writers time to modify their software, and for pre-DSC software to have fallen out of use. Second, the PostScript masters of interest are all automatically produced by a small set of applications (or an even more limited set of drivers called by other applications). If these applications ever fail to produce conformant documents it is in a very limited set of ways. Experience supports this view: the majority of applications appear to produce conformant PostScript, while the exceptions appear to break in predictable ways.

Document management systems are sometimes called upon to perform such tasks as job subsetting and page re-ordering (typically page reversal). The requirements of such a system are much like those for a splitter, which divides the job into independent pages or groups of pages: each group when printed must print correctly despite having been removed from the environment of the job in which it originated.

Accordingly there is a need for a system which is not limited to manipulating the pages in perfectly conformant documents, but can handle documents that are close to conformance, breaking the rules in predictable ways. Such a system is a subject of this invention.

The conventions describe material contained in specially formatted comments, which means that a PostScript document need not conform in order to print correctly. Certain print services depend on conformance, which supplies the motivation for applications writers to conform. A DSC-conformant document begins with the comment "%!PS-Adobe-3.0<type>$_{opt}$" where the type indicates whether it is a regular file, an encapsulated PostScript file (EPSF), or of type Query, ExitServer or Resource. For the present invention, interest primarily rests in regular files, for which a type is not supplied, and EPSF, when it occurs as a sub-document in a regular file. A document manager (which could be a splitter) is expected to assume that a document is conformant if it begins with this comment. Experience has shown that files with version 2.1 are equally likely to be page independent.

The conventions describe a document as containing a prolog and a script, the prolog containing material that must be copied to the beginning of every sub-document when a document is split, and the script containing a small amount that also must be copied, followed by the independent page material. It begins with a "%%BeginSettup:" comment, and ends with an "%%EndSetup" comment, which should be followed immediately by the first "%%Page: <label>#" comment.

The content for a page normally begins with a "%%Page:" comment, and ends with a "%%PageTrailer" comment, although the "%%PageTrailer" comment is optional.

The convention specifications clearly indicate that only one %%EOF should appear in a document, and that a document manager should take the first occurrence as indicating end of file. However, PageMaker™ has been known to combine multiple documents by appending them (including the %% EOF) into one file. This is one example of an error in conformance that is easily recognized and fixed.

Besides the comment structuring conventions, the creator should put all the PostScript material needed on all pages before the first "%%Page:" comment, with the caveat that a creator is allowed to signal a failure to do so with a "%%PageOrder: Special" comment. If a document manager sees this comment, it is normally expected to assume the document is not page independent. However, at least one application always uses that sequence, effectively disabling any document management features that require page independence. It is the goal of this invention to allow a document manager to ignore the "%%PageOrder: Special", (for known applications) without generating incorrect output.

Accordingly, there is a need for a system or method to identify preselected tokens or idioms which are known to preclude independent handling of selected portions of the print job. The print job then needs to be adjusted to facilitate its splitting with minimal adjustment of the print job itself. The subject invention satisfies these needs and thus overcomes the problems specified above, as well as others.

BRIEF SUMMARY

In a nearly page-independent document print job, such as is typically generated by modern applications and drivers, there is enough information in the header material of the files of the print job to identify the creator. For those creators known to generate incorrect files or files that would be out of page independent conformance due to the inclusion of certain predetermined idioms or tokens, a search is made for those idioms in the files that cause the processing of the files to fail when split into segregated pages. Corrective action is implemented while splitting the files into pages or chunks so that the files may be safely reordered, interpreted and/or printed in parallel, subsetted, or treated in any other way that requires page or chunk independence. Implementation of the subject invention facilitates page parallel RIP (Rasterizing Image Processing), as well as other applications including page reversal before RIP, subset RIP and print, and page parallel print on multiple printers.

The subject invention comprises a unique implementation of parallelism for which we can find no satisfactory defined term, and thus functioning as our own lexicographer, we will refer to this concept as "chunk" parallelism. Chunk parallelism is an intermediate level of parallelism between job parallelism and page parallelism. A chunk is a collection of rasterized data consisting of at least one page and not more than one job. A chunk may be an integer number of pages less than an entire job but has a rasterizing overhead occurring on a chunk basis as opposed to a per page basis.

The printing system of the subject invention comprises a printer; a plurality of processing nodes, each processing node being disposed for processing a portion of a print job into a printer dependent format; and a processing manager for splitting the print job into segregated portions for independent processing by the processing nodes into the printer dependent format. The processing manager includes means for identifying selected idioms within the print job known to preclude splitting of the print job into a plurality of the portions for independent processing. The processing manager adds the selected identified idioms or portions of the print job associated with the idioms that manipulate the print job, to the segregated portions during the splitting to enable the successful processing. The idioms are attached to a header of the print job and prefixed to each of the segregated portions.

In accordance with another aspect of the present invention, a method is provided for splitting a nearly-page independent print job into a plurality of job chunks for independent parallel processing by a plurality of processing nodes. The method comprises searching the print job for predetermined idioms known to preclude the successful independent processing of the chunks. Idioms are saved in the header portion of the print job. The job is split into the job chunks and the idioms are added to the job chunks to enable their successful independent processing. The adding preferably comprises prefixing the header to the job chunks.

A first particular advantage of the subject invention is parallel RIP node processing functionality when the print job is not page guaranteed.

The second advantage is print job splitting so that the files of the print job may be safely reordered, interpreted and/or printed in parallel, subsetted or treated in any other way that requires page independence. Such splitting particularly enables page parallel RIP as well as page reversal before RIP, subset RIP and print, and page parallel print on multiple printers.

Other advantages and benefits of the present invention will become apparent to those of ordinary skill in the art upon a reading and understanding of the following detailed description of the preferred embodiments.

DESCRIPTION OF THE PREFERRED EMBODIMENTS

Figure 1:
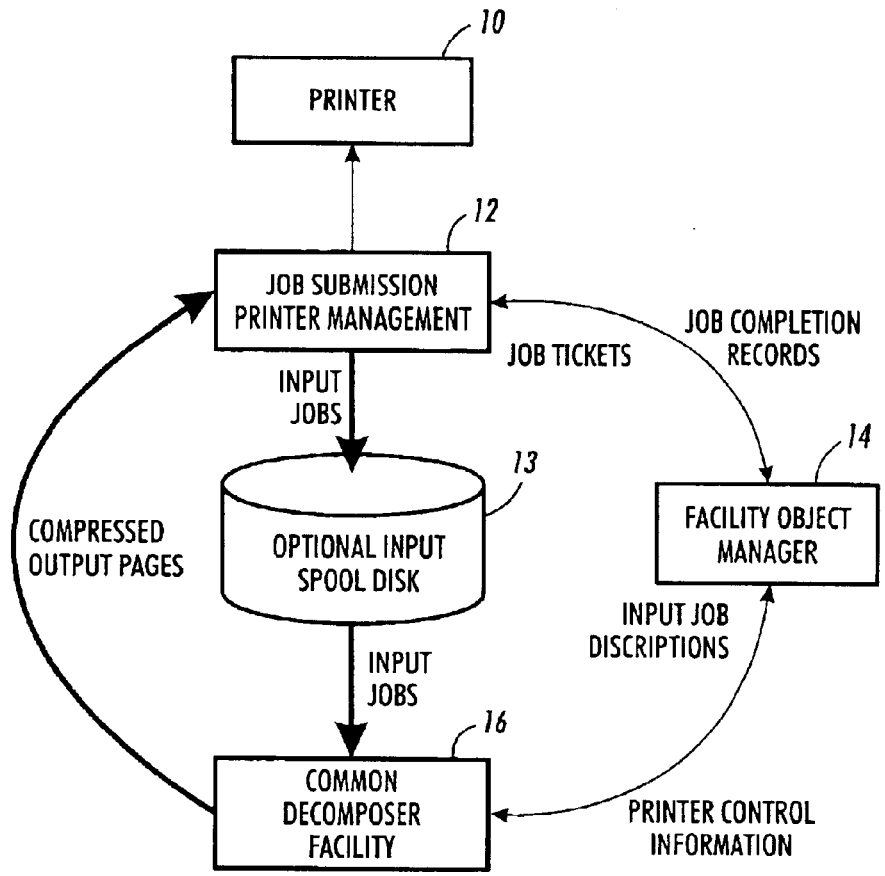
FIG. 1 is a block diagram illustrating the architecture for control and data flow of a printing system formed in accordance with the present invention.

While the present invention will hereinafter be described in connection with preferred embodiments thereof, it will be understood that it is not intended to limit the invention to those embodiments. On the contrary, it is intended to cover all alternatives, modifications and equivalents as may be included within the spirit and scope of the invention as defined in the appended claims.

The present invention addresses the continuing need for better handling of a print job especially where selected portions of the job need special processing as well as faster printing systems—particularly systems where every page can be color and different. The system exploits parallelism to facilitate its speed, and additionally an implementation of parallelism not known in prior art printing systems which had been limited to job parallelism or page parallelism. The subject invention may exploit an intermediate level of parallelism herein defined as "chunk" parallelism. A chunk of print job data is intended to comprise a collection of rasterizable data of at least one page and not more than one job. Job parallelism would occur when a job is smaller than the minimum chunk size, page parallelism occurs when the minimum chunk size is 0 (bytes/pages). The subject invention is useful for splitting a print job into portions for either job, page or chunk parallel processing.

The subject invention is described largely in the context of splitting a job into a set of chunks which, combined, form the entire document. However, other applications exist. A splitter is readily adapted to the problem of page reversal: in the simplest implementation single page chunks are produced, and then they are gathered in reverse order to form the reversed document. The reversed document may now be printed using a serial or parallel system. A somewhat more efficient approach would be to make a single pass through the document finding material that should have been in the header but was not, and appending it to the header, and then putting out the header only once, followed by all of the pages in reverse order.

Another application is job subsetting, in which a specified subset of the document is required. The splitter may proceed without producing any output until it reaches the first page to be printed. It then forms a single chunk containing all of the requested pages (which may or may not be contiguous). This chunk now contains the desired subset. The chunk may now be printed using a serial or parallel system. A more efficient approach in the parallel case would be to have the splitter suppress pages not to be printed but produce multiple chunks in the same fashion as if it were not subsetting.

In addition to the requirements described in the background section of the present application, there are many other requirements for conformance, most of which appear to be followed. The parser/splitter (which is intended to implement one embodiment of the present invention) checks many of the requirements, in part to increase the level of confidence in the document's conformance (and hence splitability), and in part to determine whether any known failures should be sought (based on creator).

Two well known systems particularly useful for generating graphics printing, Quark® and PageMaker® have been known to include violations of page independence despite being DSC conformant. Both Quark and PageMaker sometimes define a font (it appears that they find the font and apply a transformation to it, caching it in a global dictionary), just before the first time it is used (i.e. after the start of the first page), and then use it without redefining it on subsequent pages. They both use the convention that fonts defined in this way have names in the global dictionary that begin with "_____"(six underscore characters). To fix masters generated by these two creators, the document manager checks for the six-underscore idiom after the first "%%Page": comment. This is done by augmenting the list of tokens the lexical analyzer finds to include the token '_____', first, by adding '_' to the table already containing flags for "<eol>%" and "%%", and second by checking for the right number of additional underscores when a double underscore is found. (Recall that the document manager scans the file two bytes at a time, and uses table lookup to determine whether a two-byte sequence might be the start of a comment). This introduces very little overhead for Quark and PageMaker files that do not include this idiomatic failure, and next to no overhead at all for other types of files.

Once a six-underscore token is found, separate, creator-dependent routines are called to capture exactly the right set of lines before and after that token, and these are attached to the end of the already-captured text of the header section, to be prefixed to all subsequent pages (but not to the current one).

The following example shows a piece of PostScript code that causes a document to lose page-independence. This is only an example, and is typical of an idiom found in QuarkXPress files:

```
%%Page: 1 1
%%BeginPageSetup
%RBIIncludePageSlotInvocation
mTSsetup
pmSVsetup
initializepage
(skywalker; page: 1 of 5) setjob
%%EndPageSetup
gS 0 0 589 767, rC
1 G
0 0 0 0 rF
0 0 :M
%QRKSequentialPageRange: 1 5
%QRKPageBegin: 1
%QRKSequentialPage: 1
QuarkXPress__4.04 begin
F/ss X 1 1 pen 0 H 0 a 0 b [ ] 0 p
0 H
(29 29 679 679 initclip F rc u)kp
xpbu − 1 F 60 45 sp0 T, xpscrn
calcbnd
xpbn
s2qd
−1000 −1000 :M
f58 sf
( )S
−1000 −1000 :M
xps2ps
xpbu
0 0 F 0 (|____55-Helvetica-Roman) T F /|____HelveticaNeue-Roman 0 T dfnt
xpbn
. . .
5, 8, 8, f
end
%%QRKPageEnd
endp
%%PageTrailer
%%Page: 2 2.
```

This PostScript fragment locates a font, applies a transformation to it, and stores it using the symbol "|_____55-Helvetica-Roman" in a global dictionary named "QuarkXPress__4.04". It does this by means of specifying a number of parameters (numbers and names) and invoking a number of previously defined procedures (such as "xpbu" and "xpbn"). All of this is done in the portion of the document which should be part of page 1, and not part of the document header (it follows the first "%%Page:" comment). If the document manager were to split the document into its header material and then prepend only that portion to each of the pages (i.e. the portions beginning with every "%%Page" and ending immediately before the next "%%Page" or the end of file), the document would fail to print, since later pages reference the symbol "|_____55-Helvetica-Roman".

Figure 2:
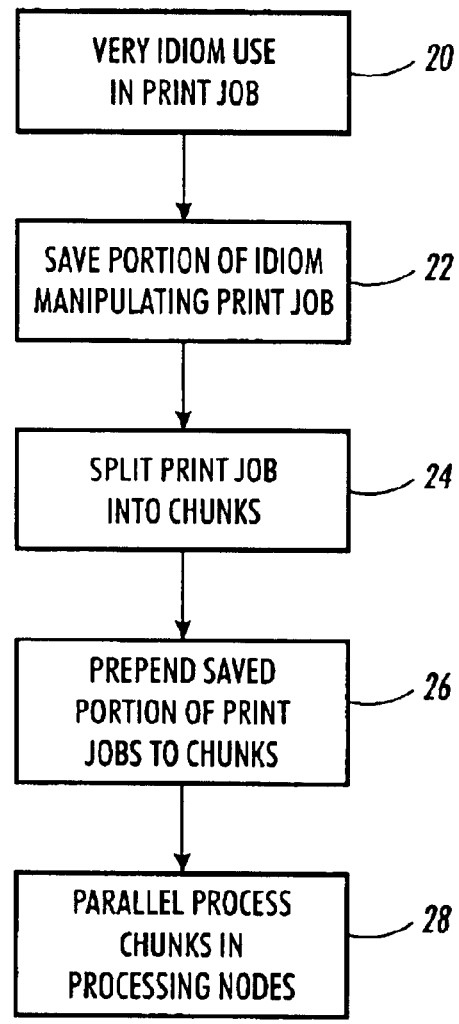
FIG. 2 is a flowchart summarizing a method for processing a print job in accordance with the present invention.

With particular reference to FIGS. 1 and 2, the system architecture, control of data flow and processing steps of the subject invention comprise a print engine 10 which is managed by a processing node 12 responsible for job submission to the printer 10 and printer management. When a print job is submitted to the print system, an input spooling system 14 saves the content either in memory or on disk. The job submission node also advises the facility object manager 14 of the arrival of the print job. The facility object manager 14 functions as a processing manager assembly for effecting the necessary supervisory functions, such as identifying print job language, job size, and how/where to find print job data within the memory system. Any of several known mechanisms may be used to communicate the location of the data, including the network file name for a distributed system, or memory address for a centralized system. The processing manager node 14 also includes a splitter for splitting the print job into portions capable of being independently processed in the common decomposer facility 16 comprised of a plurality of independent operating processing nodes (RIPs). The common decomposer facility provides translation of the print job in its input form to printer dependent-ready form for submission to the printer 10.

The subject invention is more particularly concerned with how the facility operator 14 splits the job into job chunks which are guaranteed independence for independent processing in the RIPs. The first step comprises a search of the print job to verify 20 if there are idioms or tokens known to normally generate a fault upon the independent processing if the print job were to be split into independent portions. In other words, certain predetermined idioms can be identified which are known to involve, for example, font manipulation but are disposed in a location within the print job precluding the splitting of the job into pages for generated independent page parallel processing. By idiom or token is meant a portion of the print job effecting any such manipulation, such as font manipulation, as well as other types of job content manipulation. After the inclusion of such idioms are verified, the portion of the print job associated with the idiom is saved 22 to facilitate its movement or addition to different locations in the print job that guarantee page independence. The facility object manager can split 24 the print job into whatever portions are most appropriate for RIP processing, i.e., pages or chunks. The saved portion associated with the idiom is then prepended 26 to the split chunks, thereby guaranteeing independence of the chunks for successful processing in the common decomposer facility 16. The chunks are then processed 28 in the facility 16.

After the initial %!PS-Adobe-3.0 comment, all remaining DSC comments are preceded by a new line or carriage return character, (ASCII 13 and 10) and begin with two "%" characters. As such, they may be found in running PostScript by scanning the file two bytes (one short word) at a time and using a single table lookup per short word. The initial portion of the file contains only comments, and for this portion it is more efficient to use a byte-aligned search. At the first non-comment line, the parser switches to short-aligned searching. By constructing the lookup table on the fly, the parser is immune to byte-order dependencies.

An algorithm to find such an idiom and save the portion needed and to prepend it to subsequent pages follows.

| | |
|---|---|
| 1. | After finding a %%Page:" comment in a file known to be created by QuarkXpress, 1. Set found = false. |
| 2. | Advance to the next end of line. |
| 3. | Set StartingPosition1 to the position of the start of the current line. |
| 4. | Set StartingPosition2 to 0 |
| 5. | For a maximum of 28 lines, |
| 5.1. | If the current line begins with "%%QRKSequentialPage:" |
| 5.1.1. | set found to the value true, leave this loop (go to step 6) |
| 5.2. | If the current line begins with "initiatizepage", |
| 5.2.1. | set endingPosition1 to the location of the previous end of line, |
| 5.2.2. | set startingPosition2 to the location of The end of the current line. |
| 5.3. | Advance to the next line |
| 6. | If found is false stop (the idiom was not found) |
| 7. | Set found = false. |
| 8. | Advance to the next line. |
| 9. | If the current line does not begin with "QuarkXPress" stop (the idiom was not found) |
| 10. | Set more = false. |
| 11. | For a maximum of 30 lines |
| 11.1. | If the current line contains six underscores |
| 11.1.1. | Set found = true |
| 11.1.2. | Set more = true |
| 11.1.3. | Leave this loop (go to step 12) |
| 11.2. | Advance to the next line |
| 12. | If found, is false stop (the idiom was not found) |
| 13. | If more is true |
| 13.1. | For a maximum of 4 lines |
| 13.1.1. | If the current line begins with "xpbn" |
| 13.1.1.1. | Exit this loop (go to step 14) |
| 13.1.2. | Advance to the next line |
| 13.2. | Set endingPosition2 to the end of the current line. |
| 13.3. | Go to step 10 |
| 14. | Save the portion from startPosition1 to endingPosition1, and from startPosition2 to endingPosition2. |

The accumulated saved portion is then appended to the text of the header portion, followed by the single line end to close a dictionary opened by the QuarkXPress-4.04 begin This entire sequence is used instead of simply the text of the header portion, to precede every page, in the case of page-parallel printing, or back-to-front printing, or to precede every independent block of pages, in the case of subset printing.

What the above method does, is

Verify that the idiom is used in the file

Save the portion that does the font manipulation, omitting the initializepage

Make begin/end pairs match in the saved portion.

In that manner, subsequent pages can be made independent of previous pages by ensuring that font definitions are placed in the header section.

Some files contain a "%%IncludeResource:" comment prior to defining fonts in much the same manner as above; when that token is encountered at the file level (not in enclosed documents) similar processing follows.

One other failure mode has been observed with Page-Maker. PageMaker permits the user to build a document from multiple independent files. When the user does so, the PostScript master emitted appears to be multiple conformant documents concatenated together, thereby containing multiple "%%EOF" comments, in violation of the standard. For the sake of these masters, the document manager checks after the end of file to see whether it really is at the end of the physical file, and then loops back and attempts to parse a new document.

In summary, the essence of the invention is to automatically edit portions of nearly-page independent PDL files, in order to make them page independent, and then continue with any operation such as page reversal, page parallel printing or subset printing, that requires page independence. The method uses the technique of idiom recognition, relying on the fact that certain patterns never appear in files except when they are doing something that breaks page independence, and also relying on those files being readily fixed by simple editing operations.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications, variations, improvements, and substantial equivalents.

What is claimed:

1. A method for splitting a print job lacking page independence into selected chunks, wherein the chunks can be independently processed into a printer dependent format for printing by a printer, the method comprising:

searching the print job for a selected token known to normally generate a fault upon the independent processing if the print job were to be split into the selected chunks;

saving the selected token found in the search;

splitting the print job into the selected chunks; and, associating the selected token found in the searching with at least one of the selected chunks for guaranteeing processing independence of the one selected chunk.

2. The method of claim 1, further comprising processing the selected chunks into a printer dependent form.

3. The method as defined in claim 2, wherein the processing employs a plurality of processing nodes.

4. The method as defined in claim 1, wherein the searching comprises verifying a use of the selected token in the print job by identifying selected program idioms therein precluding predetermined processing operations such as page re-ordering, page parallel printing and subset printing.

5. The method as defined in claim 4, wherein the saving comprises attaching the idioms in a header of the print job.

6. The method as defined in claim 5, wherein the attaching comprises attaching a portion of the print job associated with the idiom which is responsible for a manipulation of the print job.

7. The method as defined in claim 5, further comprising outputting the chunks in reverse order and wherein the associating comprises prefixing the header only once to the reversed print job.

8. The method as defined in claim 5, wherein the associating comprises prefixing the header to the selected chunks.

9. The method of claim 1, further comprising determining the creator of the print job and wherein the token sought in the step of searching the print job for selected token depends on the determined creator.

10. The method of claim 1, wherein the splitting comprises splitting the job so that all of the chunks in the job each comprise one page.

11. The method of claim 10, further comprising outputting the selected chunks in a reverse order.

12. A printing system comprising:

a printer;

a plurality of processing nodes, each processing node being disposed for processing a portion of a print job into a printer dependent format;

a processing manager for splitting the print job into segregated portions for independent parallel processing by the processing nodes into the printer dependent format, wherein the processing manager includes means for identifying selected idioms within the print job known to preclude splitting of the print job into a plurality of the portions for independent processing by the processing nodes, and means for adding the identified selected idioms to at least one of the segregated portions during the splitting to enable the successful processing.

13. The printing system of claim 12, wherein the means for adding comprises means for attaching the idioms to a header of the print job and prefixing a copy of the header to each of the segregated portions.

14. The printing system of claim 13, wherein the idioms comprise a portion of the print job which manipulates the print job.

15. The printing system as defined in claim 12, wherein the segregated portions are disposed in a reverse order for printing, and the processing manager affixes the header to the reversed print job.

16. The printing system as defined in claim 12, wherein the processing manager includes means for determining the creator of the print job and wherein the selected idioms depend on the determined creator.

17. The printing system of claim 12, wherein the segregated portions comprise a page of the print job.

18. A method for splitting a nearly page independent print job into a plurality of job chunks for independent parallel processing by a plurality of processing nodes, comprising:

searching the print job for predetermined idioms known to preclude the successful independent processing of the chunks;

saving the idioms in a header of the print job;

splitting the print job into the job chunks; and, adding the idioms to the job chunks to enable the successful independent processing of the job chunks.

19. The method as defined in claim 18, wherein the adding comprises prefixing the header to the job chunks.

20. The method of claim 18, further comprising determining the creator of the print job and wherein the tokens sought in the step of searching the print job for selected tokens depend on the determined creator.

21. The method of claim 18, wherein the splitting comprises splitting the job so that all of the chunks in the job each comprise one page.

22. The method of claim 18, further comprising outputting the selected chunks in a reverse order.

* * * * *